United States Patent
Fleishman et al.

[19]

[11] Patent Number: 6,067,870
[45] Date of Patent: May 30, 2000

[54] MANUAL TRANSAXLE

[75] Inventors: Steven Fleishman, Constantia; K. K. Natarajan, Cicero; Robert S. Hatton, East Syracuse; Alan P. Zajac, Clay; David Wenthen; Lee B. Arnold, both of Syracuse, all of N.Y.

[73] Assignee: New Venture Gear, Inc., Troy, Mich.

[21] Appl. No.: 09/260,532

[22] Filed: Feb. 26, 1999

[51] Int. Cl.[7] .................................................. F16H 3/08
[52] U.S. Cl. ............................................... 74/331; 74/333
[58] Field of Search .................................... 74/331, 333

[56] References Cited

U.S. PATENT DOCUMENTS

| | | | |
|---|---|---|---|
| 4,226,135 | 10/1980 | Winter | 74/331 X |
| 4,273,007 | 6/1981 | Sato et al. | 74/331 X |
| 4,398,432 | 8/1983 | Quick | 74/331 |
| 4,463,622 | 8/1984 | Freiburger | 74/331 X |
| 4,569,252 | 2/1986 | Harper . | |
| 5,311,789 | 5/1994 | Henzler et al. | 74/331 |
| 5,346,442 | 9/1994 | Eastman . | |
| 5,385,064 | 1/1995 | Reece | 74/331 |
| 5,697,250 | 12/1997 | Ahluwalia et al. . | |
| 5,704,247 | 1/1998 | Ahluwalia et al. . | |
| 5,735,175 | 4/1998 | Forsyth . | |
| 5,743,141 | 4/1998 | Forsyth . | |
| 5,816,101 | 10/1998 | Weston | 74/331 |
| 5,845,531 | 12/1998 | Fraley et al. . | |
| 5,927,145 | 7/1999 | Ahluwalia et al. | 74/331 |

FOREIGN PATENT DOCUMENTS 9010806  9/1990  WIPO .

*Primary Examiner*—Charles A. Marmor
*Assistant Examiner*—Ha Ho
*Attorney, Agent, or Firm*—Harness, Dickey & Pierce, P.L.C.

[57] ABSTRACT

A compact six-speed fully-synchronized manual transaxle includes an input shaft having four fixed input gears, a first intermediate shaft rotatably supporting four speed gears meshing with four of the input gears, a second intermediate shaft rotatably supporting two speed gears meshed with two of the input gears and a reverse gear meshed with a speed gear on the first intermediate shaft, and a differential. A transfer gear on each intermediate shaft is meshed with a final drive gear fixed to the differential.

11 Claims, 2 Drawing Sheets

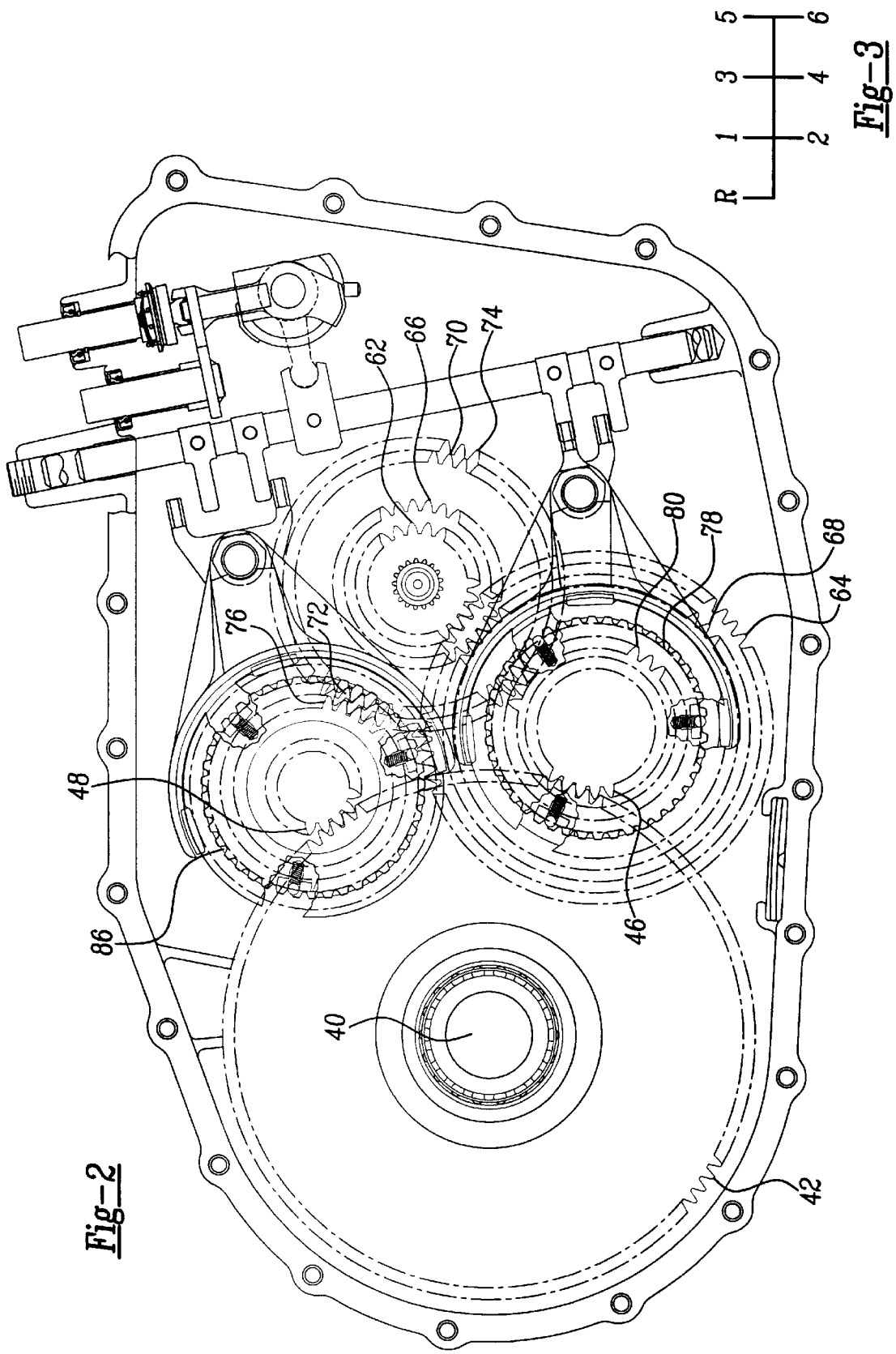

MANUAL TRANSAXLE

BACKGROUND OF THE INVENTION

This invention relates generally to manual multi-speed transmissions for use in motor vehicles. More specifically, the present invention is directed to a compact manual transaxle having a synchronized reverse gear.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least five forward speed ratios. As such, minimizing the overall axial length of the transaxle as well as its shaft center distances is of critical importance to the transmission designer. To meet these requirements, various "three-shaft" type transaxle have been developed. For example, U.S. Pat. No. 4,738,150 discloses a five-speed manual transaxle having an input shaft and a pair of countershafts both of which drive the differential which, in turn, drives the axle half-shafts. Gearsets on both countershafts can be selectively engaged to deliver power from the input shaft to the half-shafts. Furthermore, commonly-owned U.S. Pat. Nos. 5,697,250 and 5,704,247 disclose five-speed transaxles having a synchronized reverse gear arrangement.

Accordingly, while such conventional manual transaxle designs address the packaging requirements mentioned above, a need still exists for development of compact and robust six-speed fully-synchronized manual transaxles that can meet the demands of modern front wheel drive vehicular applications.

SUMMARY OF THE INVENTION

The primary object of the present invention is to provide a six-speed fully-synchronized manual transaxle that meets the above-noted needs and improves upon conventional designs.

To this end, the present invention is directed to a six-speed manual transaxle comprised of an input shaft, a first intermediate shaft having a first transfer gear fixed thereto, a second intermediate shaft having a second transfer gear fixed thereto, a final drive assembly having a drive gear which is meshed with the first and second transfer gears, a first input gear fixed to the input shaft, a first speed gear rotatably supported on the first intermediate shaft and meshed with the first input gear, a second input gear fixed to the input shaft, a second speed gear rotatably supported on the first intermediate shaft and meshed with the second input gear, a first synchronizer clutch for selectively coupling either of the first and second speed gears to the first intermediate shaft, a third input gear fixed to the input shaft, a third speed gear rotatably supported on the second intermediate shaft and meshed with the third input gear, a fourth input gear fixed to the input shaft, a fourth speed gear rotatably supported on the second intermediate shaft and meshed with the fourth input gear, a second synchronizer clutch for selectively coupling either of the third and fourth speed gears to the second intermediate shaft, a fifth speed gear rotatably supported on the first intermediate shaft and meshed with the third input gear, a sixth-speed gear rotatably supported on the first intermediate shaft and meshed with the fourth input gear, a third synchronizer clutch for selectively coupling either of the fifth and sixth speed gears to the first intermediate shaft, a reverse gear rotatably supported on the second intermediate shaft and meshed with the first speed gear, and a fourth synchronizer clutch for releasably coupling the reverse gear to the second intermediate shaft.

BRIEF DESCRIPTION OF THE DRAWINGS

Further objects, features and advantages of the present invention will become apparent to those skilled in the art from studying the following description and the accompanying drawings in which:

FIG. 2 is a schematic view showing the shaft and gearing arrangement for the transaxle shown in FIG. 1; and FIG. 3 is a shift gate diagram for the transaxle shown in FIG. 1.

DETAILED DESCRIPTION OF THE PREFERRED EMBODIMENT

Figure 1:
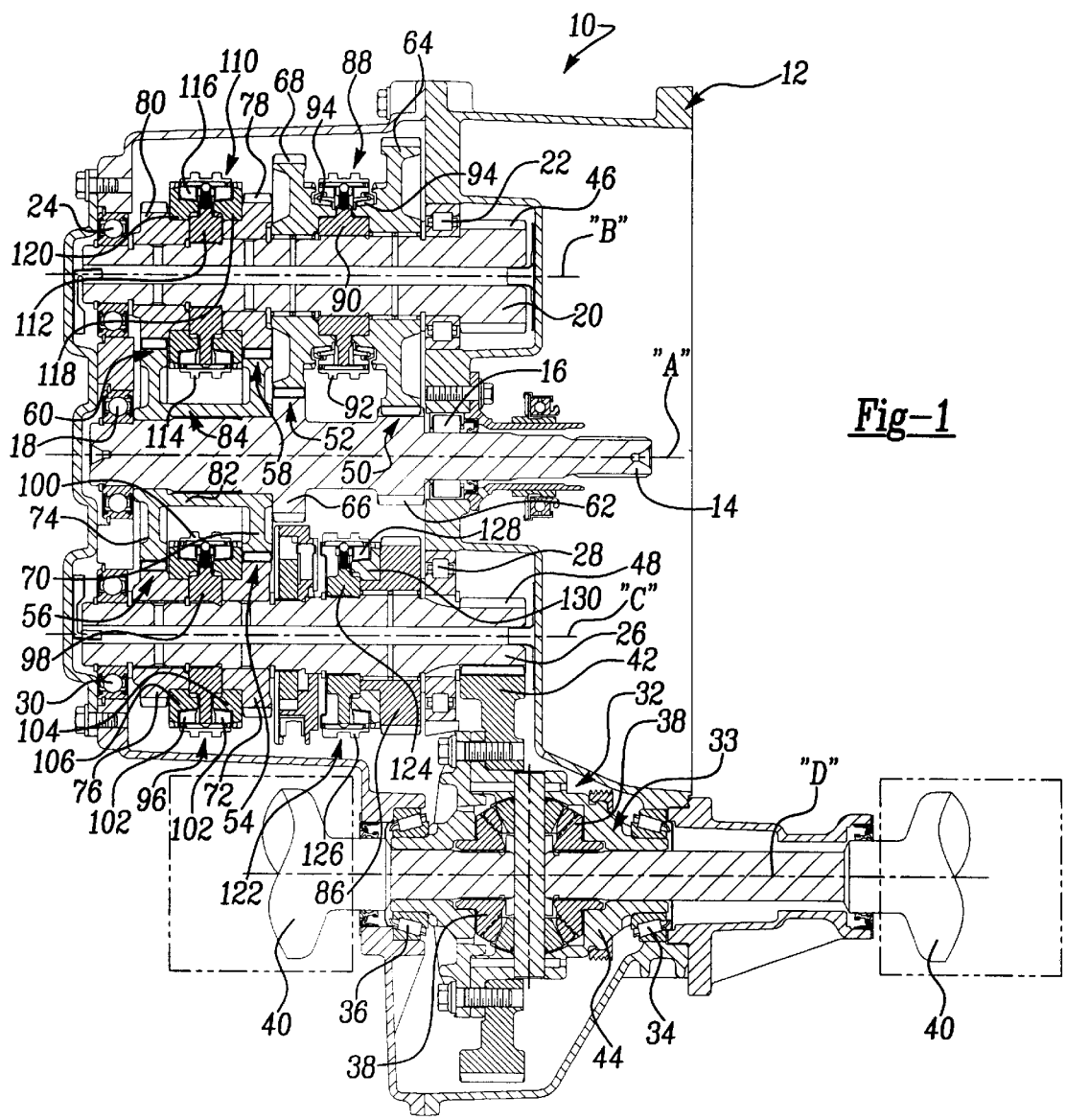
FIG. 1 is a sectional view of a six-speed manual transaxle constructed according to a preferred embodiment of the present invention.

Referring now to the drawings, a manual transaxle 10 is shown that is adapted for use in front wheel drive motor vehicles. Transaxle 10 is a six-speed arrangement having all of its forward and reverse gears synchronized and yet is efficiently packaged to provide a compact gearbox.

With particular reference to FIG. 1, transaxle 10 is shown to include a housing 12 within which an input shaft 14 is rotatably supported by bearings 16 and 18 for rotation about a first axis "A". As is conventional, input shaft 14 is adapted to be driven through a suitable manually-released clutch (not shown) by the vehicles's engine. Transaxle 10 is also shown to include a first intermediate shaft 20 rotatably supported in housing 12 by bearings 22 and 24 for rotation about second axis "B", a second intermediate shaft 26 rotatably supported in housing 12 by bearings 28 and 30 for rotation about a third axis "C", and a final drive assembly 32 supported in housing 12 by bearings 34 and 36 for rotation about a fourth axis "D". As is also conventional, final drive assembly 32 includes a differential 33 having a pair of axially-aligned side gears 38 to which axle half-shafts 40 are fixed so as to connect differential 33 to the driving wheels of the motor vehicle. Drive torque is supplied to differential 33 via a final drive gear 42 fixed to a differential case 44 and which is in constant meshed engagement with a first transfer gear 46 fixed to first intermediate shaft 20 as well as with a second transfer gear 48 fixed to second intermediate shaft 26. To provide a means for minimizing deflection of intermediate shafts 20 and 26, transfer gears 46 and 48 are "overhung" with respect to bearing assemblies 22 and 28, respectively. It will be appreciated that FIG. 1 is a so-called "unrolled" sectional view wherein shafts 14, 20, 26 and 40 are all arranged in a single plane. However, in reality, these shafts are compactly arranged parallel to each other, with no three thereof in a common plane, as shown in FIG. 2. In this manner, the center distance between the shafts can be effectively minimized.

Transaxle 10 includes a series of constant-mesh gearsets 50, 52, 54, 56, 58 and 60 that can be selectively engaged for establishing six forward speed ratios between input shaft 14 and final drive gear 42. Gearset 50 includes a first input gear 62 fixed to input shaft 14 and a first speed gear 64 rotatably supported on first intermediate shaft 20. First speed gear 64 is in constant mesh with first input gear 62 for defining a first power transmission path that can be selectively engaged to establish a first forward speed ratio. Gearset 52 includes a second input gear 66 fixed to input shaft 14 that is in constant mesh with a second speed gear 68 rotatably supported on first intermediate shaft 20. Thus, gearset 52 functions to define a second power transmission path that can be selectively engaged to establish a second forward speed ratio.

Gearset 54 includes a third input gear 70 fixed to input shaft 14 that is in constant mesh with a third speed gear 72 rotatably supported on second intermediate shaft 26. As such, gearset 54 functions to define a third power transmission path that can be selectively engaged to establish a third forward speed ratio. Gearset 56 includes a fourth input gear 74 fixed to input shaft 14 that is in constant mesh with a fourth speed gear 76 rotatably supported on second intermediate shaft 26. Thus, gearset 56 functions to define a fourth power transmission path that can be selectively engaged to establish a fourth forward speed ratio. Gearset 58 includes a fifth speed gear 78 rotatably supported on first intermediate shaft 20 which is meshed with third input gear 70. Thus, gearset 58 functions to define a fifth power transmission path that can be selectively engaged to establish a fifth forward speed ratio. Gearset 60 includes a sixth speed gear 80 rotatably supported on first intermediate shaft 20 that is meshed with fourth input gear 76. Gearset 60 defines a sixth power transmission path that can be selectively engaged to establish a sixth forward speed ratio. As seen, third input gear 70 and fourth input gear 74 are attached to or integrally formed on a stub shaft 82 to define a compound gear 84. Stub shaft 82 is fixed (i.e., splined) to input shaft 14. Finally, transaxle 10 further includes a constant-mesh reverse gearset for establishing a reverse speed ratio which includes a reverse gear 86 rotatably supported on second intermediate shaft 26 and which is in constant mesh with first speed gear 64. The reverse gearset defines a seventh power transmission path that can be selectively engaged to establish the reverse gear ratio.

According to a preferred arrangement, the six forward speed ratios are sequential with the number of teeth for each gear component listed in the following table:

| Gear Component | Number of Teeth |
|---|---|
| final drive gear 42 | 111 |
| first transfer gear 46 | 27 |
| second transfer gear 48 | 17 |
| first input gear 62 | 23 |
| first speed gear 64 | 71 |
| second input gear 66 | 33 |
| second speed gear 68 | 62 |
| third input gear 70 | 53 |
| third speed gear 72 | 41 |
| fourth input gear 74 | 57 |
| fourth speed gear 76 | 34 |
| fifth speed gear 78 | 40 |
| sixth speed gear 80 | 35 |
| reverse gear 86 | 48 |

As is well known, the meshed gearsets can be selected to provide alternative gear ratios required for a different transmission application.

To provide means for establishing the various forward and reverse speed ratios by selectively engaging one of the available power transmission paths, each gearset is associated with a synchronizer clutch. In particular, a first synchronizer clutch 88 is operably located between first and second speed gears 64 and 68 and includes a hub 90 fixed to first intermediate shaft 20, a shift sleeve 92 mounted for rotation with and axial sliding movement on hub 86, and a pair of suitable synchronizers 94 interposed between shift sleeve 92 and speed gears 64 and 68. First synchronizer clutch 88 is of the double-acting variety such that axial movement of shift sleeve 92 in a first direction from its centered neutral position shown is adapted to couple first speed gear 64 to first intermediate shaft 20 for establishing the first forward speed ratio in which first transfer gear 46 drives final drive gear 42. Moreover, axial movement of shift sleeve 92 in the opposite direction from its neutral position is adapted to couple second speed gear 68 to first intermediate shaft 20 such that first transfer gear 46 drives final drive gear 42 at the second forward speed ratio.

To establish the third and fourth forward speed ratios, a second synchronizer clutch 96 is located between third and fourth speed gears 72 and 76 and includes a hub 98 fixed to second intermediate shaft 26, a shift sleeve 100 mounted for rotation with and axial sliding movement on hub 98, and a pair of synchronizers 102 interposed between shift sleeve 96 and third and fourth speed gears 72 and 76. As seen, a clutch gear 104 fixed to third speed gear 72 and a clutch gear 106 fixed to fourth speed gear 76. Second synchronizer clutch 96 is of the double-acting type such that axial movement of shift sleeve 100 in a first direction from its neutral centered position shown is adapted to couple clutch gear 104 and third speed gear 72 to second intermediate shaft 26 such that second transfer gear 48 drives final drive gear 42 at the third forward speed ratio. Moreover, axial movement of shift sleeve 100 on the opposite direction from its centered neutral position is adapted to couple clutch gear 106 and fourth speed gear 76 to second intermediate shaft 26 such that second transfer gear 48 drives final drive gear 42 at the fourth speed ratio.

The fifth and sixth forward speed ratios are established via a third synchronizer clutch 110, again of the double-acting variety, that is located between fifth speed gear 78 and sixth speed gear 80. Synchronizer clutch 110 includes a hub 112 fixed to first intermediate shaft 20, a shift sleeve 114 mounted for rotation with and axial sliding movement on hub 1 12, and a pair of synchronizers 116 interposed between shift sleeve 114, a clutch gear 1 18 fixed to fifth speed gear 78 and a clutch gear 120 fixed to sixth speed gear 80. Sliding movement of shift sleeve 114 in a first direction from its centered neutral position shown is adapted to couple clutch gear 118 and fifth speed gear 78 to first intermediate shaft 20 such that first transfer gear 46 drives final drive gear 42 at the fifth speed ratio. In contrast, sliding movement of shift sleeve 114 in the opposite direction from its neutral position couples clutch gear 120 and sixth speed gear 80 to first intermediate shaft 20 such that first transfer gear 46 drives final drive gear 42 at the sixth forward speed ratio.

The reverse speed ratio is established via a fourth synchronizer clutch 122 which includes a hub 124 fixed to second intermediate shaft 26, a shift sleeve 126 mounted for rotation with and sliding movement on hub 124, and a synchronizer 128 positioned between shift sleeve 126 and a clutch gear 130 fixed to reverse gear 86. Sliding movement of shift sleeve 126 from the neutral position shown is adapted to couple reverse gear 86 to second intermediate shaft 26 such that second transfer gear 48 drives final drive gear 42 at the reverse speed ratio and in the opposite direction with respect to the direction of rotation of final drive gear 42 effected during forward operation. This reversal of direction results from reverse gear 82 being driven by first speed gear 64 which, in turn, is driven by first input gear 62.

In the first forward gear, torque is delivered from input shaft 14 to differential 32 through elements 62, 64, 92, 90, 20, 46 and 42. In the second forward gear, torque is delivered from input shaft 14 to differential 32 through elements 66, 68, 92, 90, 20, 46 and 42. In the third forward gear, torque is delivered from input shaft 14 to differential 32 through elements 82, 70, 72, 100, 98, 26, 48 and 42. In the fourth forward gear, torque is delivered from input shaft 14 to differential 32 through elements 82, 74, 76, 100, 98, 26, 48 and 42. In the fifth forward gear, torque is delivered from input shaft 14 to differential 32 through elements 82, 70, 78, 114, 112, 20, 46 and 42. In the sixth forward gear, torque is delivered from input shaft 14 to differential 32 through elements 82, 74, 80, 114, 112, 20, 46 and 42. Finally, in the reverse gear, torque is delivered from input shaft 14 to differential 32 through elements 62, 64, 86, 126, 124, 26, 48, and 42.

FIG. 2 is a schematic illustration of the arrangement of shafts 14, 20, 26 and 40 and of the meshing of the various gearsets. In addition, a shift pattern or gate diagram for transaxle 10 is shown in FIG. 3. Obviously, any suitable shift system causing coordinated movement of shift sleeves 92, 100, 114 and 126 in response to movement of a gearshift lever (not shown) to establish the various forward and reverse gears can be used with transaxle 10.

The foregoing discussion discloses and describes a presently preferred embodiment of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A manual transmission comprising:
   an input shaft having a proximal end adapted to be drivingly connected to an engine and a distal end;
   a first intermediate shaft having a first transfer gear fixed thereto at a first end thereof;
   a second intermediate shaft having a second transfer gear fixed thereto at a first end thereof;
   a first input gear fixed proximal to said proximal end of said input shaft;
   a first speed gear rotatably supported on said first intermediate shaft proximal to said first transfer gear and meshed with said first input gear;
   a second input gear fixed to said input shaft;
   a second speed gear rotatably supported on said first intermediate shaft and meshed with said second input gear;
   a first synchronizer clutch for selectively coupling either of said first and second speed gears to said first intermediate shaft;
   a compound gear fixed to said input shaft and including third and fourth input gears fixed to a stub shaft;
   a third speed gear rotatably supported on said second intermediate shaft and meshed with said third input gear;
   a fourth speed gear rotatably supported on said second intermediate shaft and meshed with said fourth input gear;
   a second synchronizer clutch for selectively coupling either of said third and fourth speed gears to said second intermediate shaft;
   a fifth speed gear rotatably supported on said first intermediate shaft and meshed with said third input gear;
   a sixth speed gear rotatably supported on said first intermediate shaft and meshed with said fourth input gear;
   a third synchronizer clutch for selectively coupling either of said fifth and sixth speed gears to said first intermediate shaft;
   a reverse gear rotatably supported on said second intermediate shaft proximal to said second transfer gear and meshed with said first speed gear;
   a fourth synchronizer clutch for selectively coupling said reverse gear to said second intermediate shaft; and
   a final drive gear meshed with said first and second transfer gears.

2. The manual transmission of claim 1 further comprising a pair of axle shafts and a differential driven by said final drive gear for transferring drive torque to said axle shafts while permitting speed differentiation therebetween.

3. The manual transmission of claim 1 wherein said first synchronizer clutch includes a first shift sleeve mounted for rotation with said first intermediate shaft and movable from a first neutral position in a first direction for selectively engaging said first speed gear so as to establish a first forward speed ratio, and wherein said first shift sleeve is movable in a second direction from said first neutral position for selectively engaging said second speed gear for establishing a second forward speed ratio.

4. The manual transmission of claim 3 wherein said second synchronizer clutch includes a second shift sleeve mounted for rotation with said second intermediate shaft and movable from a second neutral position in a first direction to selectively engage said third speed gear for establishing a third speed ratio, and wherein said second shift sleeve is movable from said second neutral position in a second direction for selectively engaging said fourth speed gear for establishing a fourth forward speed ratio.

5. The manual transmission of claim 4 wherein said third synchronizer clutch includes a third shift sleeve mounted for rotation with said first intermediate shaft and movable from a third neutral position in a first direction for selectively engaging said fifth speed gear for establishing a fifth forward speed ratio, and wherein said third shift sleeve is movable from said third neutral position in a second direction for selectively engaging said sixth speed gear for establishing a sixth forward speed ratio.

6. The manual transmission of claim 5 wherein said fourth synchronizer clutch includes a fourth shift sleeve mounted for rotation with said second intermediate shaft and movable from a fourth neutral position in a first direction for selectively engaging said reverse gear for establishing a reverse speed ratio.

7. The manual transmission of claim 1 further comprising:
   a housing;
   a first pair of bearings supporting said first intermediate shaft for rotation relative to said housing;
   a second pair of bearings supporting said second intermediate shaft for rotation relative to said housing;
   said first transfer gear is located outward of said first pair of bearings and said second transfer gear is located outward of said second pair of bearings.

8. A manual transaxle comprising:
   an input shaft having a proximal end adapted to be drivingly connected to an engine and a distal end;
   a differential;
   first and second intermediate shafts having first ends in driving connection with said differential;
   first and second input gears fixed to said input shaft said first input gear fixed proximal to said proximal end of said input shaft;
   first and second speed gears rotatably supported on said first intermediate shaft and meshed respectively with said first and second input gears said first speed gear supported proximal to said first end of said intermediate shaft;
   a first synchronizer clutch for selectively coupling either of said first and second speed gears to said first intermediate shaft;

a compound gear fixed to said input shaft and including third and fourth input gears fixed to a stub shaft;

third and fourth speed gears rotatably supported on said second intermediate shaft and meshed respectively with said third and fourth input gears;

a second synchronizer clutch for selectively coupling either of said third and fourth speed gears to said second intermediate shaft;

fifth and sixth speed gears rotatably supported on said first intermediate shaft and meshed respectively with said third and fourth input gears;

a third synchronizer clutch for selectively coupling either of said fifth and sixth speed gears to said first intermediate shaft;

a reverse gear rotatably supported on said second intermediate shaft proximal to said first end and meshed with said first speed gear; and a fourth synchronizer clutch for selectively coupling said reverse gear to said second intermediate shaft.

9. The manual transaxle of claim 8 further comprising a pair of axle shafts driven by said differential for transferring drive torque from said first and second intermediate shafts to said axle shafts while permitting speed differentiation therebetween.

10. The manual transaxle of claim 9 wherein said first synchronizer clutch includes a first shift sleeve mounted for rotation with said first intermediate shaft and movable from a first neutral position in a first direction for selectively engaging said first speed gear so as to establish a first forward speed ratio, and said first shift sleeve is movable in a second direction from said first neutral position for selectively engaging said second speed gear for establishing a second forward speed ratio, wherein said second synchronizer clutch includes a second shift sleeve mounted for rotation with said second intermediate shaft and movable from a second neutral position in a first direction to selectively engage said third speed gear for establishing a third speed ratio, and said second shift sleeve is movable from said second neutral position in a second direction for selectively engaging said fourth speed gear for establishing a fourth forward speed ratio, and wherein said third synchronizer clutch includes a third shift sleeve mounted for rotation with said first intermediate shaft and movable from a third neutral position in a first direction for selectively engaging said fifth speed gear for establishing a fifth forward speed ratio, and said third shift sleeve is movable from said third neutral position in a second direction for selectively engaging said sixth speed gear for establishing a sixth forward speed ratio.

11. The manual transaxle of claim 10 wherein said fourth synchronizer clutch includes a fourth shift sleeve mounted for rotation with said second intermediate shaft and movable from a fourth neutral position in a first direction for selectively engaging said reverse gear for establishing a reverse speed ratio.

* * * * *